US006606305B1

(12) United States Patent
Boyle et al.

(10) Patent No.: US 6,606,305 B1
(45) Date of Patent: Aug. 12, 2003

(54) APPARATUS, METHOD AND SYSTEM FOR AUTOMATIC TELECOMMUNICATION CONFERENCING AND BROADCASTING

(75) Inventors: Patrick Joseph Boyle, Naperville, IL (US); Catherine Mary FitzPatrick, Winfield, IL (US); John Matthew Gafrick, Naperville, IL (US); Mark Alan McCormick, Naperville, IL (US); Kathleen Anne Perkins, Warrenville, IL (US); Robin Jeffrey Thompson, Batavia, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/199,850

(22) Filed: Nov. 25, 1998

(51) Int. Cl.[7] ................................................ H04M 3/42
(52) U.S. Cl. ...................................... 370/260; 379/205
(58) Field of Search ................................. 370/259, 260, 370/261, 263, 265, 266, 270, 401, 432, 328; 455/518; 379/201, 202, 204, 205

(56) References Cited

U.S. PATENT DOCUMENTS 5,559,876 A * 9/1996 Alperovich ................. 379/205
5,631,904 A * 5/1997 Fitser et al. ................ 370/261
5,712,908 A * 1/1998 Brinkman et al. .......... 379/119
6,038,304 A * 3/2000 Hart ........................... 379/202

* cited by examiner

Primary Examiner—Ken Vanderpuye
(74) Attorney, Agent, or Firm—Nancy R. Gamburd

(57) ABSTRACT

An apparatus, method and system are provided for automatic telecommunication conferencing and broadcasting. The system embodiment includes a switch for reception of a first incoming call leg designating a multiple leg service, such as a telecommunication conference, and also designating a subscriber group. Each particular subscriber group is predefined, and consists of a list of directory numbers to be included within the conference or broadcast session. The system embodiment also includes a conference bridge coupled to the switch, in which the conference bridge includes instructions to receive the first incoming call leg routed from the switch, to determine the plurality of directory numbers associated with the subscriber group, and to return to the switch a plurality of intermediate incoming call legs corresponding to the plurality of directory numbers for routing by the switch to form a plurality of outgoing call legs. The conference bridge also includes further instructions to monitor answering of the plurality of outgoing call legs, and to connect an outgoing call leg indicating joinder, of the plurality of outgoing call legs, to the conference bridge for a multiple leg telecommunication session, such as a conference or broadcast session.

59 Claims, 5 Drawing Sheets

APPARATUS, METHOD AND SYSTEM FOR AUTOMATIC TELECOMMUNICATION CONFERENCING AND BROADCASTING

CROSS-REFERENCE TO RELATED APPLICATION

The present application is related to Boyle et al. U.S. patent application Ser. No. 09/197,843, entitled "Apparatus, Method and System For Roamer Originated Automatic Telecommunication Conferencing and Broadcasting", Lucent IDS 116,216 and Lucent Case No. Boyle 3-2-4-1-9-2-10, filed concurrently herewith and commonly assigned to Lucent Technologies, Inc., and incorporated by reference herein, with priority claimed for all commonly disclosed subject matter (the "related application").

FIELD OF THE INVENTION

The present invention relates in general to telecommunication systems and services, and more particularly, to an apparatus, method and system for automatic telecommunication conferencing and broadcasting.

BACKGROUND OF THE INVENTION

Various telecommunication systems and services are currently available which provide for telecommunication conferencing, such as the capability for participation in a single communication session by multiple parties, from multiple different locations on separate communication lines, such as from three or more different locations. Many telephone systems include such a conferencing feature, but are typically limited to a small number of different locations, lines or parties, such as limited to a three-way conference.

More complicated conferencing systems typically require both advanced notification to and call setup directly by the telecommunication service provider. For example, a conference call may be established by the local telecommunication service provider, with each conference call leg being individually connected into the telecommunication session by a telecommunication operator or attendant.

Other teleconferencing systems, such as that available from Nextel utilizing a Motorola system, requires the use of specialized, proprietary telecommunication equipment for all conference call legs. In addition, in these systems, complete two-way communication (full duplex) is not provided, with service being limited to either receiving (listening) or transmitting (talking) at any given time (half duplex). For example, in the Motorola system, a conferee desiring to speak must press a "push to talk" button in order to verbally participate in the conference.

As a consequence, a need remains for an apparatus, method and system to provide for automatic telecommunication conferencing and broadcasting. Such an apparatus, method and system should be capable of full duplex communication, allowing a conferee to both speak and listen at the same time during a conference call. Such an apparatus, method and system should also be recipient independent, namely, independent of the particular equipment utilized by any particular end user. Such an apparatus, method and system should also provide for automatic telecommunication conferencing or broadcasting services, without requiring any advanced set up procedures or requiring any operator intervention.

SUMMARY OF THE INVENTION

In accordance with the present invention, an apparatus, method and system are provided for automatic telecommunication conferencing and broadcasting, that are also capable of full duplex communication, allowing a conferee to both speak and listen at the same time during a conference call. The apparatus, method and system of the present invention are also recipient independent, and do not require the use of any particular end user or other customer premise equipment. The apparatus, method and system of the present invention also provide for automatic telecommunication conferencing or broadcasting services, without requiring any advanced set up procedures or requiring any operator intervention. In addition, the apparatus, method and system of the present invention are user-friendly, and do not require any specialized knowledge or programming by a subscriber.

The system embodiment includes a switch and a conference bridge. The switch is utilized for reception of a first incoming call leg designating a multiple leg service, such as a telecommunication conference call, and also designating a subscriber group. Each particular subscriber group is predefined, and consists of a list of directory telephone numbers to be included within the conference or broadcast session. The conference bridge is coupled to the switch, and the conference bridge includes instructions to receive the incoming call leg routed to it from the switch, and based upon the designation of the subscriber group, to determine the plurality of directory numbers associated with the subscriber group of the initiating subscriber, such as through a database query. The conference bridge then returns, to the switch, a plurality of intermediate call legs (or second incoming call legs) corresponding to the plurality of directory numbers, for routing by the switch to form a plurality of outgoing call legs. The conference bridge also includes further instructions to monitor answering of the plurality of outgoing call legs, and to connect an outgoing call leg indicating joinder, of the plurality of outgoing call legs, to the conference bridge for a multiple leg telecommunication session, such as a conference or broadcast session.

As each outgoing call leg may be answered by the recipients, the conference bridge includes further instructions to connect all outgoing call legs indicating joinder, of the plurality of outgoing call legs, to the conference bridge for the multiple leg telecommunication session. Depending upon the embodiment, such joinder may be indicated just by answering, or by answering followed by an activity, such as the entry of a feature code or by staying on line.

Also depending upon the chosen embodiment, the conference bridge includes further instructions to terminate the multiple leg telecommunication session when the party who originated the conference or broadcast session hangs up, namely, upon reception of an on hook message from the first incoming call leg.

Alternatively, the conference bridge includes further instructions to terminate the multiple leg telecommunication session when the last remaining participants hang up, namely, upon reception of an on hook message from a penultimate call leg remaining from a plurality of call legs forming the multiple leg telecommunication session.

For outgoing call legs which have not been answered, the conference bridge includes further instructions to release an outgoing call leg, of the plurality of outgoing call legs, which has remained unanswered for a predetermined period of time. When all of the outgoing call legs have either been answered or released, the conference bridge includes further instructions to transmit a message on the first incoming call leg (to the originator) indicating a number of outgoing call legs which have joined the multiple leg telecommunication session.

The multiple leg telecommunication session may be a full duplex conference session, indicated as part of the designation of the multiple leg service, or determined as a default by the conference bridge. Alternatively, the multiple leg telecommunication session may be a half-duplex broadcast session, preferably when indicated as part of the designation of the multiple leg service. The designation of the multiple leg service may be done through entry (and reception of) a feature code or a predetermined directory number.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
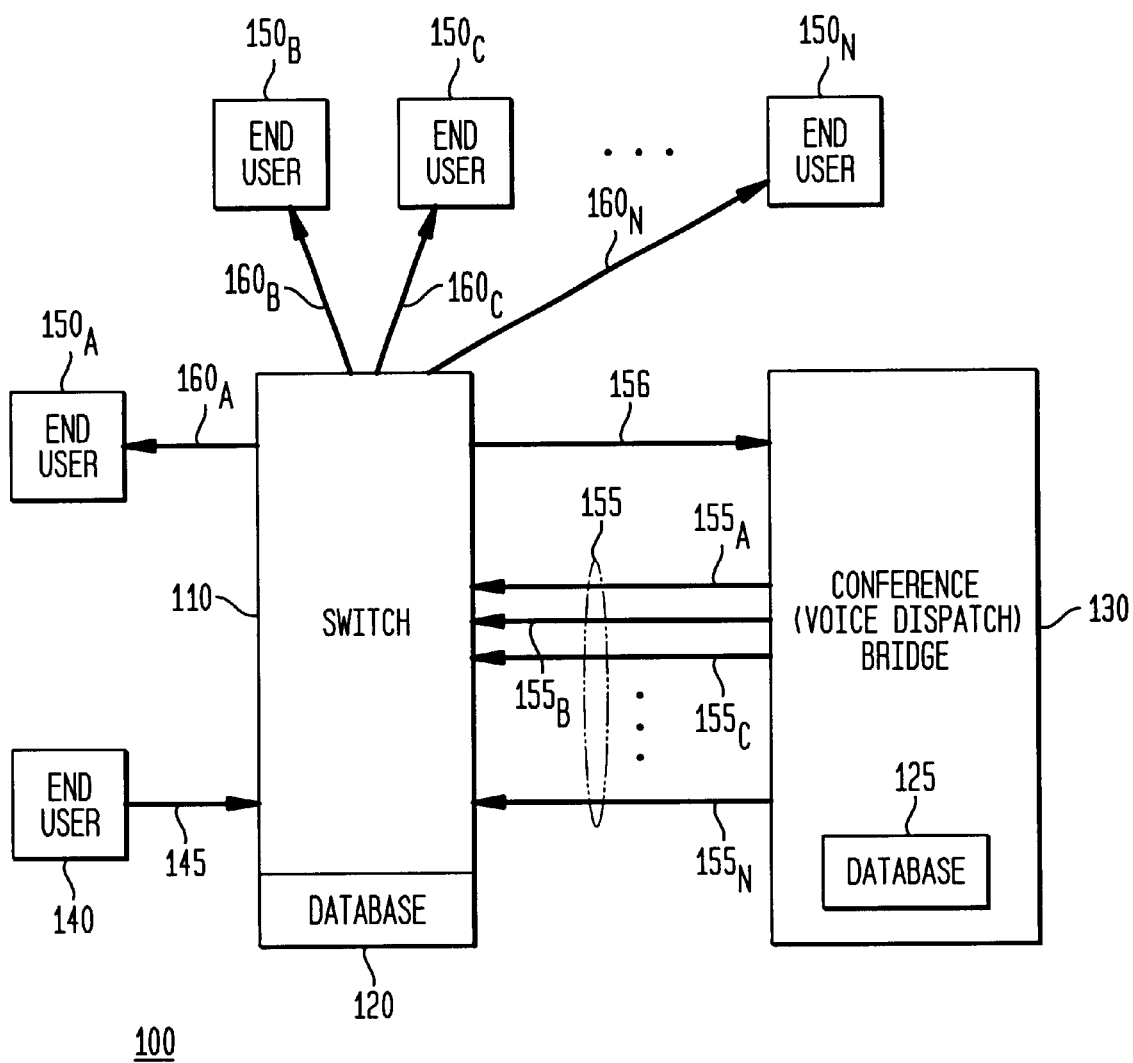
FIG. 1 is a block diagram illustrating a first system embodiment in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system to provide for automatic telecommunication conferencing and broadcasting. In accordance with the present invention, such an apparatus, method and system are provided that are capable of full duplex communication, allowing a conferee to both speak and listen at the same time during a conference call. The apparatus, method and system of the present invention are also recipient independent, and do not require the use of any particular end user or other customer premise equipment. The apparatus, method and system of the present invention also provide for automatic telecommunication conferencing or broadcasting services, without requiring any advanced set up procedures or requiring any operator intervention. In addition, the apparatus, method and system of the present invention are user-friendly, and do not require any specialized knowledge or programming by a subscriber.

FIG. 1 is a block diagram illustrating a first system embodiment 100 in accordance with the present invention. As illustrated in FIG. 1, the system 100 includes a switch 110, such as a mobile switching center ("MSC") or a wireline switching center, and a conference bridge 130, also referred to as a voice dispatch bridge. In the preferred embodiment, the switch 110 and conference bridge 130 are, respectively, an Autoplex System 1000 (large) manufactured by Lucent Technologies, Inc., and a Digital Conference and Switching System ("DCSS") formerly manufactured by Lucent Technologies, Inc. or a current equivalent. In the various preferred embodiments, the system 100 may also include various databases, such as databases 120 and 125. For example, database 120 may be a stand alone database such as a home location register ("HLR") utilized in mobile switching, or may be a database integral to the switch 110, and typically stores information pertinent to the types of services provided to particular subscribers, such as end users. The database 125 (illustrated as within, coupled to or otherwise accessible by the conference bridge 130), is utilized to store a plurality of directory (telephone) numbers for use in the conferencing or broadcasting of the present invention, as discussed in greater detail below. The various databases 120 and 125 may also be combined into a centralized database accessible by both the switch 110 and the conference bridge 130. Also as illustrated in FIG. 1, a plurality of end users 140 and $150_A$ through $150_N$, as discussed in greater detail below, may all participate in a conference or broadcast telecommunication session.

In accordance with the present invention, a user or subscriber predefines one or more conferencing groups, such as providing a list of all telephone numbers (referred to as directory numbers ("DNs")) which are to be included in any particular conferencing or broadcasting group. For example, a user may define various conferencing groups which are related to business, and others which are related to personal items, such as home, family and friends, referred to herein as subscriber groups. The conference recipients of each of these subscriber groups may utilize any type of telecommunication equipment, such as mobile or cellular handsets or ordinary PSTN ("public switched telephone network") telephones. Such end user or other customer premise equipment may also be manufactured or implemented utilizing any system, and as a consequence, the system of the present invention is recipient independent. The conference recipients may also be located anywhere, and may participate in the conference via any type of network or interface, such as PSTN, satellite, internet telephony, mobile, cellular (analog, TDMA, CDMA, etc.), and may be local or long distance.

Continuing to refer to FIG. 1, an end user, such as end user 140, has predefined one or more subscriber groups or lists or groups, preferably by directory numbers, who are to participate in a telecommunication conference or broadcast session (referred to herein as a multiple leg telecommunication session). After going off hook, in the preferred embodiment, the end user 140 may initiate such a multiple leg telecommunication session by entering a feature code (e.g., "*88") and a subscriber group number (e.g., "01", "02", etc.), such as entering "*8801" for the subscriber group one of the end user 140, or "*8802" for the subscriber group two of the end user 140. Alternatively, rather than entering a feature code, the end user 140 also may initiate such a multiple leg telecommunication session by dialing a special, predefined directory number provided by the service provider, along with a subscriber group designation such as "01" or "02". By entering such a feature code or dialing such a predefined directory number, the end user 140 thereby initiates an incoming call leg 145 to the switch 110.

As with the conference recipients, the end user 140 initiating the session also may participate in the conference via any type of network or interface, such as PSTN, satellite, internet telephony, mobile, cellular (analog, TDMA, CDMA, etc.), and may be local or long distance. Also in accordance with the related application, such an end user 140 may also initiate such a multiple leg telecommunication session from a non-local location, i.e., from any locality other than the immediate locality being directly served by the switch 110.

As discussed in greater detail below, in accordance with the present invention, such a multiple leg telecommunication session may be a full duplex conference call, in which all participants may both speak (transmit) and listen (receive). In addition, the end user 140 may also designate that the session is to be a half-duplex broadcast session, in which only the end user 140 speaks (transmits), while the other participants only listen (receive). As a consequence, depending upon the implementation of the service provider, with the feature code and subscriber group, the end user 140 may also designate that the multiple leg session is for a conference or for a broadcast. In the preferred embodiment, in the absence of a user selection, a full duplex conference session may be selected as a default.

When the switch 110 receives the incoming call leg 145, the switch 110 recognizes the feature code or the predefined directory number as a "voice dispatch" service for telecommunication conferencing or broadcasting. Utilizing the calling party number of the end user 140 and the feature code (or special DN) with a subscriber group designation, the switch 110 determines that the incoming call leg 145 is for a voice dispatch service, such as for a conference or broadcast session, and begins the set up of the multiple leg telecommunication session by transferring or transmitting the incoming call leg 145 to the conference (voice dispatch) bridge 130, illustrated as communication leg 156. In processing the incoming call leg 145, the switch 110 may also utilize the database 120, as discussed in greater detail below, such as performing a routing query to determine which trunks are connected to the conference bridge 130 for routing or transferring the incoming call leg 145. The conference bridge 130 typically receives communication leg 156 via a trunk line (not separately illustrated), having an integrated services digital network ("ISDN") user part ("ISUP") initial address message ("IAM"). In accordance with the present invention, the initial address message from the switch 110 to the conference (voice dispatch) bridge 130 should include information pertaining to: the calling party directory number; an identification of the particular subscriber group (to indicate which of the subscriber's groups is to participate in the session); and potentially also whether the communication session is to be a full duplex conference, or merely a half duplex broadcast from the end user 140 to the other end users 150.

Utilizing this information, the conference (voice dispatch) bridge 130 typically queries the database 125, performing a database look up, to determine all of the DNs which are to be included in the multiple leg telecommunication session. Such a database 125 query is typically based upon the calling party directory number (as a subscriber identification) and the various codes identifying the selected subscriber group, thereby determining all of the predefined directory numbers within the selected subscriber group. The voice dispatch bridge 130 then reserves conferencing circuitry sufficient for a conference of all the various parties designated by their directory numbers, such as reserving conference ports, announcement circuits, and dual tone multi-frequency ("DTMF") receivers. The voice dispatch bridge 130 then transmits a plurality of "intermediate" communication legs 155 (also referred to as "second" incoming call legs) to the switch 110, with each communication leg $155_A$ through $155_N$ corresponding to a directory number for every predefined directory number of the selected subscriber conference group. Each of the various communication legs $155_A$ through $155_B$ includes all information necessary or desirable for call set up, such as corresponding ISUP initial address messages having the called party directory number; an indicator that the call is a voice dispatch conference or broadcast session; a subscriber group identification (number), and the original calling party directory number.

From the point of view of the switch 110, these "intermediate" communication legs 155 importantly and simply appear to be new, incoming call legs which are to be routed to their corresponding destinations (DNs) and, as a consequence, are referred to herein as "second" or "intermediate" incoming call legs (in contrast with the "first" incoming call leg 145). As a consequence, other than recognizing the incoming call leg 145 as designating a multiple leg telecommunication session (to be transferred to the conference bridge 130), for purposes of the present invention the switch 110 is not required to have any additional, functionality or intelligence.

In turn, the switch 110 routes these intermediate incoming communication legs 155 to their corresponding designated directory numbers, illustrated as corresponding outgoing call legs $160_A$ through $160_N$ to each of their respective end users $150_A$ through $150_N$. As discussed in greater detail below, these various outgoing call legs 160 may be routed through the PSTN or through various other switches and mobile switching centers, to any directory number. More particularly, the various outgoing call legs 160 to corresponding directory numbers of the end users 150 may be wireless, wireline or other mobile communications, including to non-home mobile units, and may be via any wireline or wireless (air) interface, such as analog, TDMA, or CDMA. In addition, in the preferred embodiment, at this time the switch 110 also commences its billing procedures for automatic message accounting corresponding to a conference call.

As the various end users 150 receive and are alerted by the corresponding outgoing call legs 160, depending upon the desired implementation, each of the end users 150 may also receive information which they may use to determine whether or not to answer an outgoing call leg 160 to join the session. For example, in the preferred embodiment, the various end users 150 receive caller identification information, such as the DN and/or name of the calling party, along with a designation of the subscriber group forming the session. In various other embodiments, the end user 150 (recipient) may answer the outgoing call leg 160, followed by a separate or additional decision to join or not join the session, such as by entering a code (e.g., a number or feature code, such as entering "1" to join), by staying on the line to join, or by going on hook (hanging up) to not join. As a consequence, depending upon the desired implementation, such "joinder" information may have a variety of forms, from a simple answer, to a more complicated answer followed by an activity.

As the various end users 150 may begin to answer the corresponding outgoing call legs 160 and join the multiple leg session, such answering (and/or joinder) information is transmitted or transferred by the switch 110 back to the conference (voice dispatch) bridge 130. In the preferred embodiment, any unanswered outgoing call legs 160 are released after a predetermined period of time, such as after 30–60 seconds of alerting. As the various outgoing call legs 160 are answered, in the preferred embodiment, the conference bridge 130 generates an/announcement to each of the end users 150, such as "please hold for a voice dispatch conference call", and as mentioned above, may also indicate other activities for joining the session, such as "press 1 to join the conference call". For the outgoing call legs 160 which are joining the session, the conference bridge 130 completes the voice path connection between each of the called parties (end users 150) and the voice dispatch bridge 130, and then preferably provides information back to the calling party, in this case end user 140, indicating the number of answering parties that are now connected as a conference or broadcast session. The conference bridge 130 then completes the voice path connection to the calling party (end user 140), to form the multiple leg telecommunication session. The conference or broadcast session is then maintained as desired by either the subscriber or the service provider.

In the various embodiments, the conference session may be maintained in a variety of ways between and among the various end users 140 and 150, depending upon the implementation selected by the service provider or the subscriber. For example, the conference communication session may be maintained until the last two of the end users (140 and 150) terminate the call, i.e., until the penultimate (second to last) end user, or more simply the last end user, of the end users 140 and 150, return to an on hook status. Alternatively, as the end user 140 initiated the session, the multiple leg telecommunication session may be maintained only until the originator (end user 140) returns to an on hook status.

Numerous advantages of the system 100 in accordance with the present invention may be apparent. First, the conference or broadcast session is set up automatically through the conference bridge 130, without operator or attendant intervention. Second, no specialized or dedicated customer premise equipment is required by any of the end users 140 or 150. Third, the conference session is not limited to a few call legs. Indeed, in the preferred embodiment, the Lucent conference bridge may support as many as thousands of call legs, with an initial release considering providing about 24 call legs per subscriber group. Fourth, the multiple leg telecommunication session may be either full duplex or half-duplex. Lastly, the session may be maintained in a variety of ways, and is not limited to being maintained only while all conferees participate.

Figure 2A:
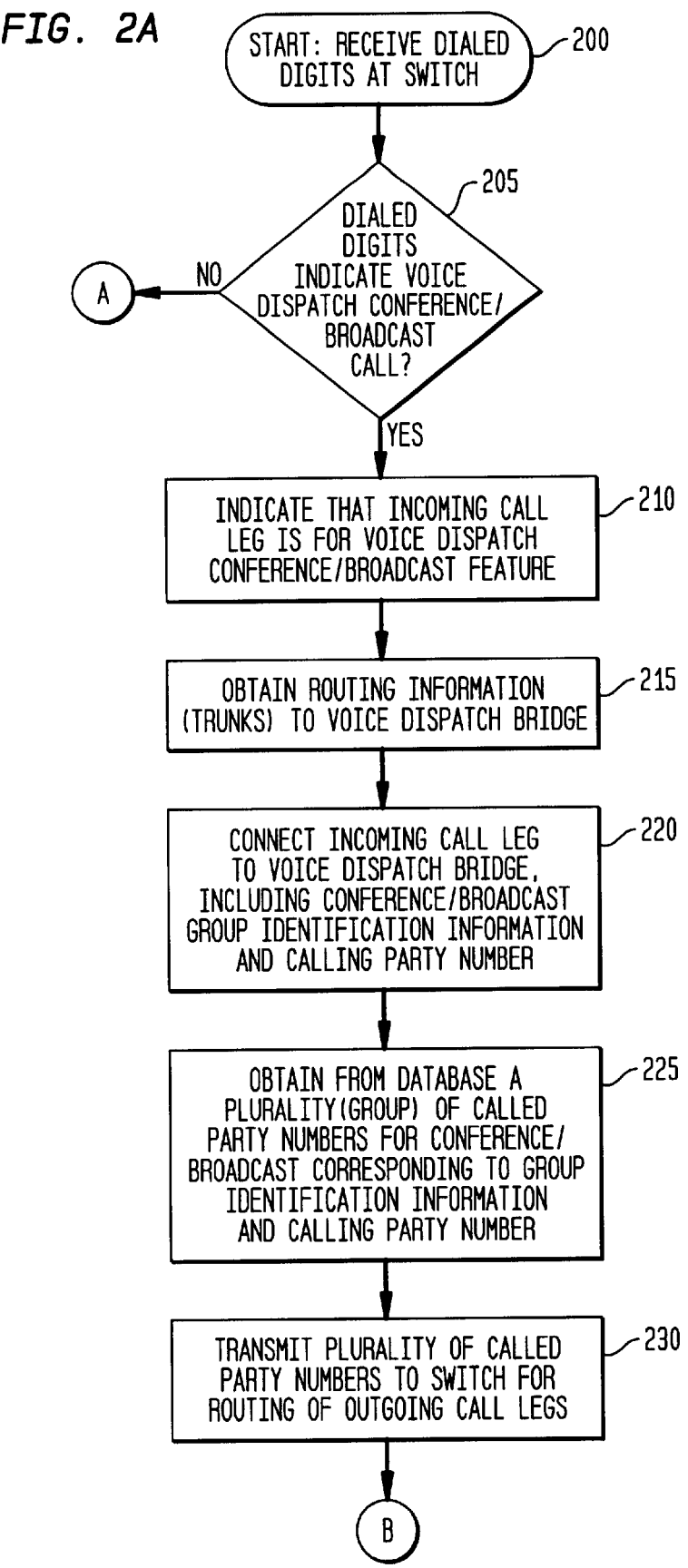
FIG. 2 is a flow diagram illustrating a method embodiment in accordance with the present invention.
Figure 2B:
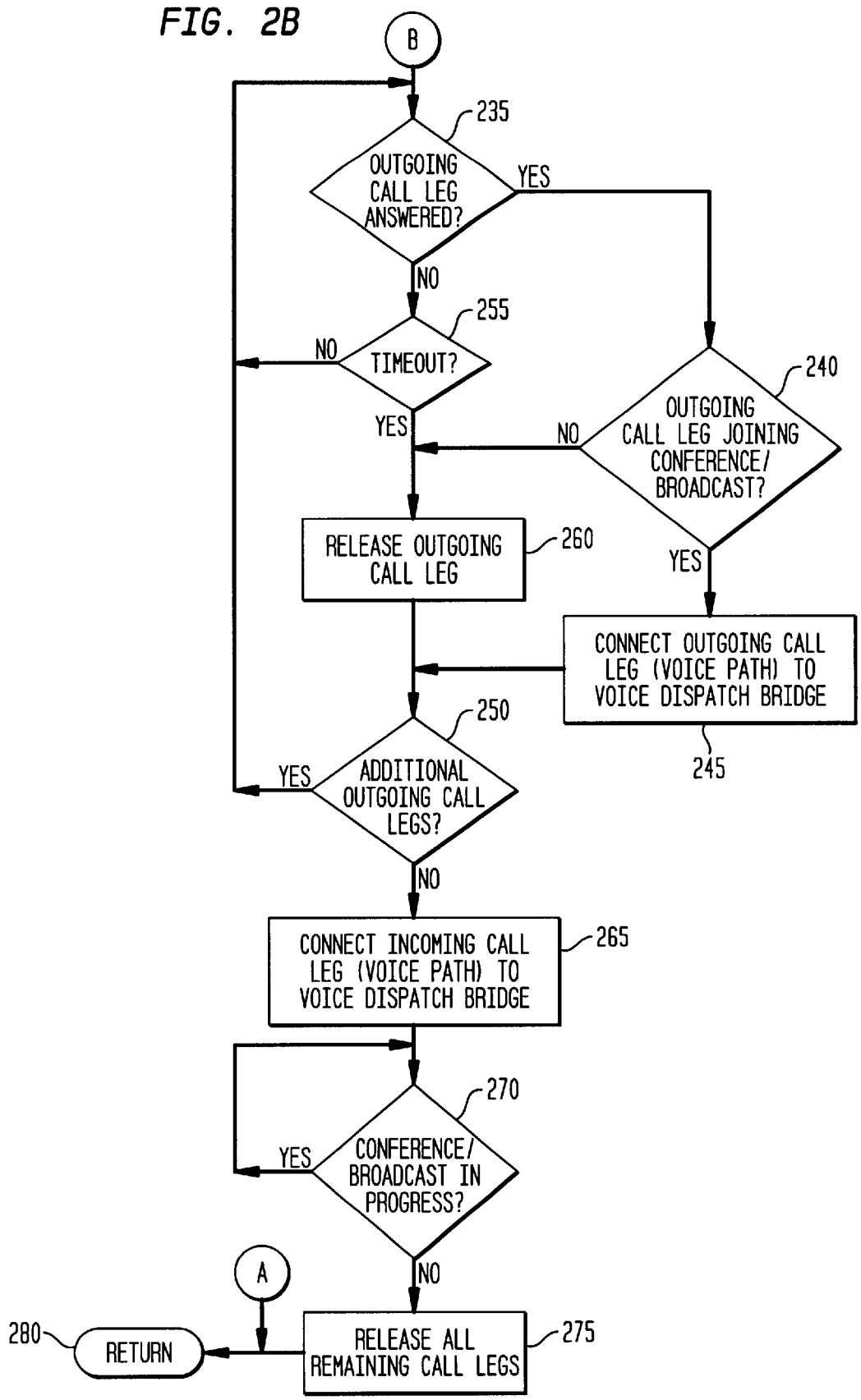

FIG. 2 is a flow diagram illustrating the method of the present invention. Beginning with start step 200, dialed or entered digits are received at a switch 110, such as through the entry by an end user 140 of a feature code or designated directory number. Next, in step 205, the switch (110) determines whether the dialed digits indicate that the incoming call leg (145) is for a voice dispatch conference or broadcast call. When the dialed digits do indicate that voice dispatch conference or broadcast service is desired in step 205, the switch indicates that the incoming call leg 145 is for this voice dispatch conference or broadcast feature, step 210, and obtains routing information (trunk lines) to the conference bridge 130, step 215. The switch 110 then connects the incoming call leg 145 to the conference (voice dispatch) bridge 130, such as through communication leg 156, including in that connection subscriber group identification information and the calling party number, step 220.

Next, in step 225, the conference bridge 130 obtains, from a database, a plurality of called party directory numbers for the conference or broadcast session, corresponding to the subscriber group identification information and the calling party number. The conference bridge 130 then transmits (as intermediate or second incoming call legs) the plurality of called party directory numbers to the switch 110 for routing as outgoing call legs 160, step 230. As the outgoing call legs are answered and answering information is transmitted back to the conference bridge 130, the conference bridge 130 determines whether a particular outgoing call leg has been answered, step 235. When an outgoing call leg has been answered, as an option in the preferred embodiment, the conference bridge 130 further determines whether the answered outgoing call leg is joining the conference or broadcast, step 240, such as when the receiving end user 150 provides such joinder information (e.g., the end user 150 presses "*" to indicate that the end user 150 is going to join the conference call). When the outgoing call leg is joining the conference or a broadcast in step 240 (or, alternatively, directly from an answered outgoing call leg in step 235), the conference bridge 130 connects the voice path of the outgoing call leg to the conference bridge 130, step 245.

When in step 235 an outgoing call leg has not been answered, the method further determines whether a predetermined period of time has elapsed, step 255. If a timeout has not occurred in step 255, the method returns to step 235, and waits until the outgoing call leg has been answered or the predetermined period of time has elapsed. When a predetermined period of time has elapsed in step 255 without the outgoing call leg having been answered, the method proceeds to step 260 and releases the outgoing call leg. Following steps 245 and 260, the method determines whether additional outgoing call legs remain, step 250, and if so, returns to step 235 and continues to determine whether outgoing call legs have been answered. If additional outgoing call legs remain (step 250) and have been answered (step 235) (and optionally indicate joinder, step 240), the method proceeds to connect each of the outgoing call legs to the conference bridge 130. Following step 250, when no further additional outgoing call legs remain unanswered or have not been released, the method proceeds to step 265 and connects the voice path of the incoming call leg to the conference bridge 130, establishing a conference or broadcast telecommunication session. In step 270, the method then continues to monitor whether the conference or broadcast session continues to be in progress. When the conference or broadcast session is terminated, such as by the originating end user going on hook or the last or penultimate remaining end users going on hook, all remaining call legs are released, step 275, and the method may end, step 280.

As mentioned above, a conference or broadcast session may be initiated by a subscriber entering either a feature code, such as *88, or a designated directory number, followed by entry of a subscriber group identification, such as "01" or "02". Through entry of either the feature code or the designated DN, the switch 110 detects that a voice dispatch conference or broadcast service is desired by the subscriber. Depending upon the system implementation, the switch 110 may include a database 120 and directly perform a database query. In the preferred embodiment, as explained below, for security reasons, the switch 110 does perform such a direct database query. More specifically, when subscriber information is entered into the various databases 120 and 125, each of the various conferencing groups of the subscriber are assigned a pseudo-random number which, in turn, are correspondingly mapped to the subscriber group identification numbers (which are easier for a subscriber to remember and enter (following the feature code, for example)). As a consequence, when the subscriber (such as end user 140) enters the subscriber group number for the conference or broadcast session, in the preferred embodiment, the switch 110 performs a first database query to obtain the corresponding, predefined pseudo-random number. During call set up, the switch includes this predefined pseudo-random number as the subscriber group identification, within the IAM transmitted to the conference bridge 130. Also, depending upon the system implementation, this database query by the switch 110 may have a variety of forms, depending upon whether the database 120 forms a integral part of the switch 110, or whether the database 120 is a stand alone database, such as a stand alone HLR. In turn, utilizing the predefined, pseudo-random number, the conference bridge 130 performs a second database query (of database 125), to obtain the group or list of DNs corresponding to the selected subscriber group.

Figure 3:
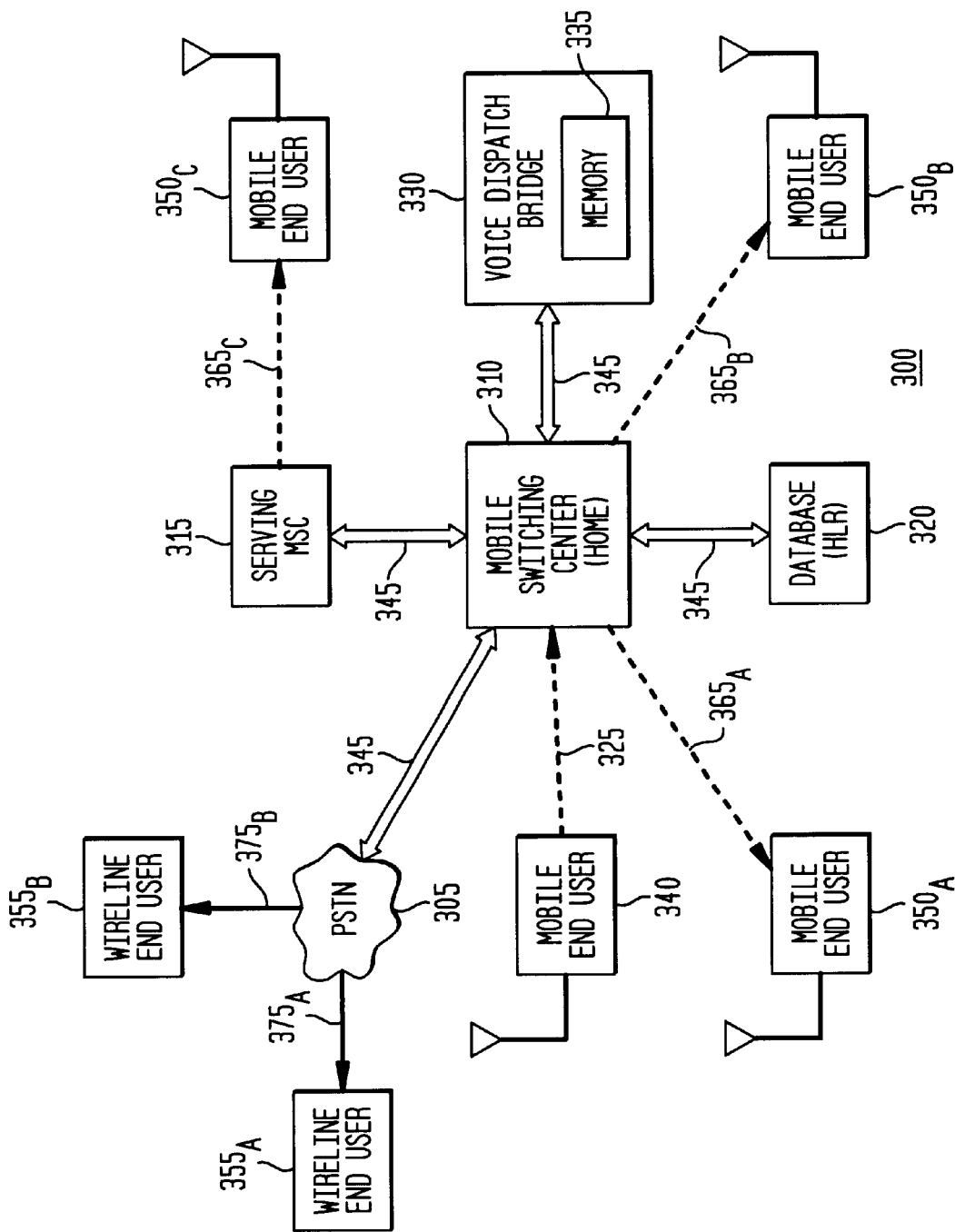
FIG. 3 is a block diagram illustrating a second system embodiment in accordance with the present invention.

FIG. 3 is a block diagram illustrating a second system embodiment 300 in accordance with the present invention, utilizing a stand-alone database (HLR) 320. When the database 120 is a stand-alone database, such as database 320, the switch 110 (illustrated as mobile switching center (MSC) 310) transmits an information request to the database 320 to obtain this subscriber group information. When the conference session is initiated through a feature code, the switch 110 (or MSC 310) transmits a feature request to the database 120 (or 320), in which the feature request includes the calling party number and group identification of the subscriber. In response, the database 120 (or 320) then transmits a feature request return result to the switch 110 (or MSC 310), in which this response indicates that this is a voice dispatch conference or broadcast call, and includes, as destination digits, identification of the selected subscriber group predefined by the subscriber (such as the predefined pseudo-random number). When the conferencing or broadcast service is to be initiated by the user entering a predefined directory number, then the switch 110 (or MSC 310) transmits an origination request (containing the same information of a feature request) to the database 120 (or 320) and in return, receives an origination request return result from the database 120 (or 320), also containing the same information included in a feature request return result. In either case, the switch 110 (or MSC 310) has received an indication that the incoming call leg is for a voice dispatch conferencing or broadcast feature, requiring routing to the conference bridge 130 (or 330), and the switch 110 (or MSC 310) may then may utilize the subscriber group number (or the predefined pseudo-random number mapped to the subscriber number) as destination digits, similarly to use of a called party number. This information is then transmitted to the conference bridge 130 (or 330) for further processing, along with the directory number of the originating end user 140 as the calling party number. In addition, in other embodiments, the switch 110 (or MSC 310) may omit this database look up procedure, and transmit the received information (such as subscriber group number) directly to the conference bridge 130 (or 330).

Continuing to refer to FIG. 3, in a second system embodiment 300, the switch 110 is implemented as a mobile switching center (MSC) 310, while the database 120 is implemented as a stand alone database (HLR) 320 (rather than an integrated HLR). The MSC 310 is also coupled to a conference (voice dispatch) bridge 330, which also includes a memory or other database 335. The database 320 and the conference (voice dispatch) bridge 330 are each connected to the MSC 310 over trunk lines 345, such as SS7 or ISUP trunks. Also as illustrated in FIG. 3, the MSC 310 is coupled via trunk lines 345 to the PSTN 305, for routing of wireline calls. The MSC 310 is also coupled through trunk lines 345 to a serving MSC 315, for routing of mobile communication sessions which are not within the geographic mobile broadcast area of the (home) MSC 310.

Continuing to refer to FIG. 3, a subscriber such as mobile end user 340 may initiate a conference or broadcast session through entry of a feature code or designated DN, which is received by the home MSC 310 through incoming call leg 325. As disclosed in the related application, a serving MSC 315 may also receive such a request, in the event the mobile end user 340 has roamed into the geographic broadcast area of the serving MSC 315.

When the MSC 310 receives an incoming call leg 325 from the mobile end user 340 designating the voice dispatch conferencing or broadcast service, in the preferred embodiment, the MSC 310 verifies that the subscriber has this service, and performs a database query to map or transform the digits entered by the user into a group identification number to be utilized by the conference bridge 330 (such as the pseudo-random number). The MSC 310 then transmits an ISUP initial address message to the conference bridge 330, having the calling DN, the group identification, and an indicator whether the desired session is a conference or broadcast session. As mentioned above, this information is typically obtained from the database (HLR) 320, through either a feature request or an origination request, with a corresponding feature request return result or origination request return result from the database 320.

The conference (voice dispatch) bridge 330, in turn, performs a database query in memory (database) 335, determining all of the predefined DNs which are in the selected subscriber group for the broadcast or conference session. The conference (voice dispatch) bridge 330 reserves various resources, such as a conference port, announcement circuits, and DTMF receivers. Via the trunk line 345, the conference (voice dispatch) bridge 330 transmits a plurality of intermediate communication legs (each having a corresponding initial address message) back to the MSC 310, one for each conferee to be included in the conference or broadcast session. Each such IAM transmitted from the conference (voice dispatch) bridge 330 to the MSC 310 includes the directory number of the called party, a voice dispatch indication, the voice dispatch subscriber group identification, and the original calling party (end user 340) directory number.

The MSC 310 then processes each of these intermediate communication legs (with their corresponding IAMs) as intermediate or "second" incoming calls, as mentioned above, generating corresponding outgoing call legs to each called directory number. These outgoing call legs are illustrated as outgoing call legs $365_A$ and $365_B$ to mobile end users $350_A$ and $350_B$ which are being served by the MSC 310; outgoing call leg $365_C$ to mobile end user $350_C$ being served by the serving MSC 315; and outgoing call legs $375_A$ and $375_B$ switched via the PSTN 305 to wireline end users $355_A$ and $355_B$ As mentioned above with regard to FIGS. 1 and 2, as each of these outgoing call legs are either answered or timed out, the voice paths of the answering call legs will be connected through the conference bridge 330, then further connected back to the mobile end user 340.

Figure 4:
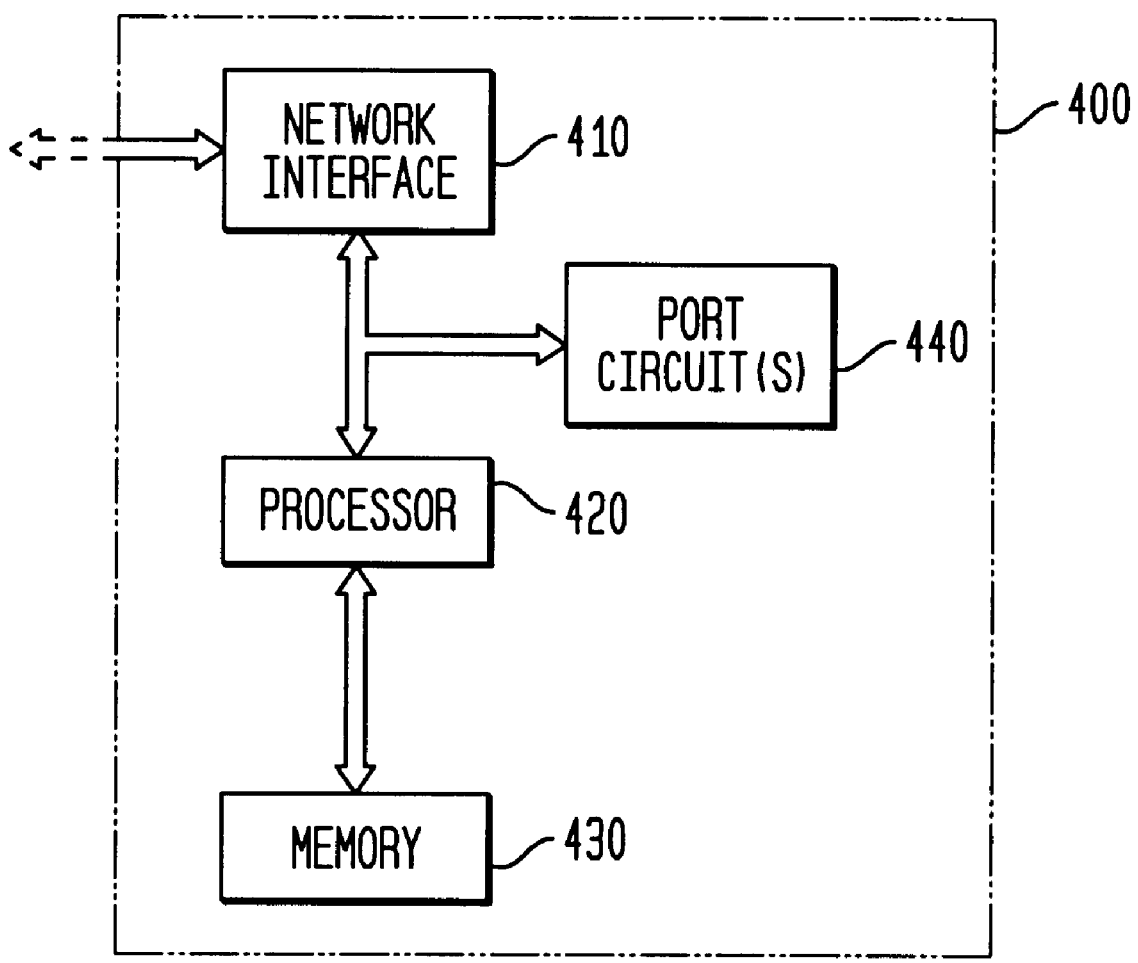
FIG. 4 is a block diagram illustrating an apparatus embodiment in accordance with the present invention.

FIG. 4 is a block diagram illustrating an apparatus 400 in accordance with the present invention. As illustrated in FIG. 4, the apparatus 400 is preferably included within a conference (voice dispatch bridge) 130 (or 330). The apparatus 400 includes a network interface 410, a processor 420, the memory 430, and the port circuits 440. The network interface 410 is utilized for communication to and from a switch 110 (or MSC 310). The memory 430 is utilized as a database, such as database 125 or memory 335. The memory 430 may be any type of data storage device, such as a random access memory (RAM), a magnetic hard drive or an optical storage medium. One or more port circuits 440 are utilized to connect the various incoming and outgoing call legs to form the multiple leg telecommunication session.

Continuing to refer to FIG. 4, the processor 420 may include a single integrated circuit (IC), or may include a plurality of integrated circuits or other components, connected, arranged or grouped together, such as microprocessors, digital signal processors (DSPs), application specific integrated circuits (ASICs), associated memory (such as RAM and ROM), and other ICs and components.

As a consequence, as used herein, the term processor should be understood to equivalently mean and include a single processor, or arrangement of processors, microprocessors, controllers or some other grouping of integrated circuits which perform the functions discussed above with reference to FIGS. 1 through 3 and also discussed in detail below, with associated memory, such as microprocessor memory or additional RAM, ROM, EPROM or E$^2$PROM. The methodology of the invention, as discussed above with reference to FIGS. 1 through 3, may be programmed and stored, in the processor 420 with its associated memory and other equivalent components, as a set of program instructions for subsequent execution when the processor 420 is operative (i.e., powered on and functioning).

In summary, the apparatus 400 for telecommunication conferencing and broadcasting, includes: first, a network interface 410 for reception of an incoming call leg designating a multiple leg service and a subscriber group; second, a port circuit 440 coupled to the network interface 410; third, a memory 430 storing a plurality of directory numbers associated with the subscriber group; and fourth, a processor 420 coupled to the network interface 410, to the port circuit(s) 440, and to the memory 430. The processor 420 includes (program) instructions to obtain from the memory 430 the plurality of directory numbers associated with the subscriber group, and to return to the network interface 410 (via the port circuit 440) a plurality of intermediate call legs corresponding to the plurality of directory numbers for subsequent routing (by a switch 110 or MSC 310) to form a plurality of outgoing call legs. The processor 420 includes further instructions to monitor answering of the plurality of outgoing call legs, and through the port circuit 440, to connect an outgoing call leg indicating joinder, of the plurality of outgoing call legs, to the incoming call leg for a multiple leg telecommunication session.

In the preferred embodiment, the processor 420 includes further instructions to terminate the multiple leg telecommunication session upon reception of an on hook message from the incoming call leg, or upon reception of an on hook message from a penultimate call leg remaining from a plurality of call legs forming the multiple leg telecommunication session. The processor 420 preferably also includes further instructions to connect all outgoing call legs indicating joinder, of the plurality of outgoing call legs, to the incoming call leg for the multiple leg telecommunication session, and to determine joinder by an answering of the outgoing call leg, or by an answering of the outgoing call leg followed by reception of a feature code.

Also in summary, the multiple leg telecommunication session may be a full duplex conference session, indicated as part of the designation of the multiple leg service, or determined as a default by the processor 420. Alternatively, the multiple leg telecommunication session may be a half-duplex broadcast session, preferably when indicated as part of the designation of the multiple leg service. The designation of the multiple leg service may be done through entry (and reception of) a feature code or a predetermined directory number.

Numerous advantages of the apparatus, method and system of the present invention may be apparent from the above discussion. First, in accordance with the present invention, an apparatus, method and system are provided for automatic telecommunication conferencing and broadcasting, that are also capable of full duplex communication, allowing a conferee to both speak and listen at the same time during a conference call. Second, the apparatus, method and system of the present invention are also recipient independent, and do not require the use of any particular end user or other customer premise equipment. Third, the apparatus, method and system of the present invention also provide for automatic telecommunication conferencing or broadcasting services, without requiring any advanced set up procedures or requiring any operator intervention. Lastly, the apparatus, method and system of the present invention are user-friendly, and do not require any specialized knowledge or programming by a subscriber.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for telecommunication conferencing and broadcasting, the method comprising:
    (a) receiving at a network switch a first incoming call leg designating a multiple leg service and a subscriber group;
    (b) routing the first incoming call leg to a conference bridge;
    (c) determining a plurality of directory numbers associated with the subscriber group;
    (d) returning a plurality of independent, intermediate incoming call legs corresponding to the plurality of directory numbers to the network switch for routing to form a plurality of independent outgoing call legs;
    (e) monitoring answering of the plurality of outgoing call legs; and
    (f) when an outgoing call leg, of the plurality of outgoing call legs, indicates joinder, within the conference bridge, connecting the outgoing call leg to the conference bridge for a multiple leg telecommunication session with the first incoming call leg.

2. The method of claim 1, further comprising:
    terminating the multiple leg telecommunication session upon reception of an on hook message from the first incoming call leg.

3. The method of claim 1, further comprising:
    terminating the multiple leg telecommunication session upon reception of an on hook message from a penultimate call leg remaining from the plurality of call legs forming the multiple leg telecommunication session.

4. The method of claim 1, further comprising:
    connecting all outgoing call legs indicating joinder, of the plurality of outgoing call legs, to the conference bridge for the multiple leg telecommunication session.

5. The method of claim 1 wherein the multiple leg telecommunication session is a full duplex conference session.

6. The method of claim 5, wherein the full duplex conference session is indicated as part of the designation of the multiple leg service.

7. The method of claim 5, wherein the full duplex conference session is determined as a default.

8. The method of claim 1 wherein the multiple leg telecommunication session is a half-duplex broadcast session.

9. The method of claim 8, wherein the half duplex broadcast session is indicated as part of the designation of the multiple leg service.

10. The method of claim 1 wherein joinder is indicated by an answering of the outgoing call leg.

11. The method of claim 1 wherein joinder is indicated by an answering of the outgoing call leg followed by reception of a feature code.

12. The method of claim 1, wherein the plurality of directory numbers corresponding to the subscriber group are predefined and stored in a database.

13. The method of claim 12, wherein determining the plurality of directory numbers is performed by a database query designating the subscriber group.

14. The method of claim 12, wherein determining the plurality of directory numbers is performed by a first database query designating the subscriber group to obtain a predefined pseudo-random number, followed by a second database query designating the predefined pseudo-random number to obtain the plurality of directory numbers corresponding to the subscriber group.

15. The method of claim 1, wherein the designation of the multiple leg service is a feature code.

16. The method of claim 1, wherein the designation of the multiple leg service is a predetermined directory number.

17. The method of claim 1, wherein step (d) further comprises transmitting an ISUP initial address message, for each intermediate incoming call leg of the plurality of intermediate incoming call legs, wherein the ISUP initial address message includes a called party directory number, a calling party directory number, an identification of the subscriber group, and an indication of the multiple leg service.

18. The method of claim 1, wherein step (b) further comprises transmitting an ISUP initial address message, wherein the ISUP initial address message includes a calling party directory number, an identification of the subscriber group, and an indicator of a type of multiple leg service.

19. The method of claim 1, further comprising:
releasing an outgoing call leg, of the plurality of outgoing call legs, which has remained unanswered for a predetermined period of time.

20. The method of claim 1, wherein step (f) further comprises:
transmitting a message on the first incoming call leg indicating a number of outgoing call legs which have joined the multiple leg telecommunication session.

21. A system for telecommunication conferencing and broadcasting, the system comprising:
a switch, the switch for reception of a first incoming call leg designating a multiple leg service and a subscriber group; and
a conference bridge coupled to the switch, the conference bridge including instructions to receive the first incoming call leg routed from the switch, to determine a plurality of directory numbers associated with the subscriber group, and to return to the switch a plurality of independent, intermediate incoming call legs corresponding to the plurality of directory numbers for routing by the switch to form a plurality of independent outgoing call legs; the conference bridge including further instructions to monitor answering of the plurality of outgoing call legs, and when an outgoing call leg, of the plurality of outgoing call legs, indicates joinder, the conference bridge including further instructions to connect the outgoing call leg to the conference bridge for a multiple leg telecommunication session with the first incoming call leg.

22. The system of claim 21, wherein the conference bridge includes further instructions to terminate the multiple leg telecommunication session upon reception of an on hook message from the first incoming call leg.

23. The system of claim 21, wherein the conference bridge includes further instructions to terminate the multiple leg telecommunication session upon reception of an on hook message from a penultimate call leg remaining from the plurality of call legs forming the multiple leg telecommunication session.

24. The system of claim 21, wherein the conference bridge includes further instructions to connect all outgoing call legs indicating joinder, of the plurality of outgoing call legs, to the conference bridge for the multiple leg telecommunication session.

25. The system of claim 21 wherein the multiple leg telecommunication session is a full duplex conference session.

26. The system of claim 25, wherein the full duplex conference session is indicated as part of the designation of the multiple leg service.

27. The system of claim 25, wherein the conference bridge includes further instructions to determine the full duplex conference session as a default.

28. The system of claim 21 wherein the multiple leg telecommunication session is a half-duplex broadcast session.

29. The system of claim 28, wherein the half duplex broadcast session is indicated as part of the designation of the multiple leg service.

30. The system of claim 21 wherein the conference bridge includes further instructions to determine joinder by an answering of the outgoing call leg.

31. The system of claim 21 wherein the conference bridge includes further instructions to determine joinder by an answering of the outgoing call leg followed by reception of a feature code.

32. The system of claim 21, further comprising a database coupled to the conference bridge, and wherein the database stores the plurality of directory numbers corresponding to the subscriber group.

33. The system of claim 32, wherein the conference bridge includes further instructions to determine the plurality of directory numbers by a database query designating the subscriber group.

34. The system of claim 32, wherein the database is further coupled to the switch, and wherein the switch includes instructions to perform a first database query designating the subscriber group to obtain a predefined pseudo-random number, and wherein the conference bridge includes further instructions to perform a second database query designating the predefined pseudo-random number to obtain the plurality of directory numbers corresponding to the subscriber group.

35. The system of claim 21, wherein the designation of the multiple leg service is a feature code.

36. The system of claim 21, wherein the designation of the multiple leg service is a predetermined directory number.

37. The system of claim 21, wherein the conference bridge includes further instructions to transmit an ISUP initial address message to the switch, for each intermediate incoming call leg of the plurality of intermediate incoming call legs, wherein the ISUP initial address message includes a called party directory number, a calling party directory number, an identification of the subscriber group, and an indication of the multiple leg service.

38. The system of claim 21, wherein the switch includes instructions to transmit an ISUP initial address message to the conference bridge, wherein the ISUP initial address message includes a calling party directory number, an identification of the subscriber group, and an indicator of a type of multiple leg service.

39. The system of claim 21, wherein the conference bridge includes further instructions to release an outgoing call leg, of the plurality of outgoing call legs, which has remained unanswered for a predetermined period of time.

40. The system of claim 21, wherein the conference bridge includes further instructions to transmit a message on the first incoming call leg indicating a number of outgoing call legs which have joined the multiple leg telecommunication session.

41. An apparatus for telecommunication conferencing and broadcasting, the apparatus comprising:

a network interface, the network interface for reception of an incoming call leg designating a multiple leg service and a subscriber group;

a port circuit coupled to the network interface;

a memory, the memory storing a plurality of directory numbers associated with the subscriber group; and a processor coupled to the network interface, to the memory and to the port circuit, the processor including instructions to obtain from the memory the plurality of directory numbers associated with the subscriber group, and to return to the network interface a plurality of intermediate call legs corresponding to the plurality of directory numbers for subsequent routing to form a plurality of outgoing call legs; the processor including further instructions to monitor answering of the plurality of outgoing call legs, and when an outgoing call leg, of the plurality of outgoing call legs, indicates joinder, to connect through the port circuit the outgoing call leg to the incoming call leg for a multiple leg telecommunication session.

42. The apparatus of claim 41, wherein the processor includes further instructions to terminate the multiple leg telecommunication session upon reception of an on hook message from the incoming call leg.

43. The apparatus of claim 41, wherein the processor includes further instructions to terminate the multiple leg telecommunication session upon reception of an on hook message from a penultimate call leg remaining from the plurality of call legs forming the multiple leg telecommunication session.

44. The apparatus of claim 41, wherein the processor includes further instructions to connect all outgoing call legs indicating joinder, of the plurality of outgoing call legs, to the incoming call leg for the multiple leg telecommunication session.

45. The apparatus of claim 41 wherein the multiple leg telecommunication session is a full duplex conference session.

46. The apparatus of claim 45, wherein the full duplex conference session is indicated as part of the designation of the multiple leg service.

47. The apparatus of claim 45, wherein the processor includes further instructions to determine the full duplex conference session as a default.

48. The apparatus of claim 41 wherein the multiple leg telecommunication session is a half-duplex broadcast session.

49. The system of claim 28, wherein the half duplex broadcast session is indicated as part of the designation of the multiple leg service.

50. The apparatus of claim 41 wherein the processor includes further instructions to determine joinder by an answering of the outgoing call leg.

51. The apparatus of claim 41 wherein the processor includes further instructions to determine joinder by an answering of the outgoing call leg followed by reception of a feature code.

52. The apparatus of claim 41, wherein the designation of the multiple leg service is a feature code.

53. The apparatus of claim 41, wherein the designation of the multiple leg service is a predetermined directory number.

54. The apparatus of claim 41, wherein the processor includes further instructions to transmit via the network interface an ISUP initial address message, for each intermediate call leg of the plurality of intermediate call legs, wherein the ISUP initial address message includes a called party directory number, a calling party directory number, an identification of the subscriber group, and an indication of the multiple leg service.

55. The apparatus of claim 41, wherein the incoming call leg includes an ISUP initial address message, wherein the ISUP initial address message includes a calling party directory number, an identification of the subscriber group, and an indicator of a type of multiple leg service.

56. The apparatus of claim 41, wherein the processor includes further instructions to release an outgoing call leg, of the plurality of outgoing call legs, which has remained unanswered for a predetermined period of time.

57. The apparatus of claim 41, wherein the processor includes further instructions to transmit, via the network interface, a message on the first incoming call leg indicating a number of outgoing call legs which have joined the multiple leg telecommunication session.

58. The apparatus of claim 41, wherein the apparatus is embodied within a conference bridge.

59. The apparatus of claim 41, wherein the apparatus is coupled to a switch for the subsequent routing of the plurality of intermediate call legs corresponding to the plurality of directory numbers to form the plurality of outgoing call legs.

* * * * *